J. R. VALENTINE AND F. W. ALKIRE.
FOOTBOARD WEATHER GUARD.
APPLICATION FILED OCT. 4, 1920.
1,385,287. Patented July 19, 1921.
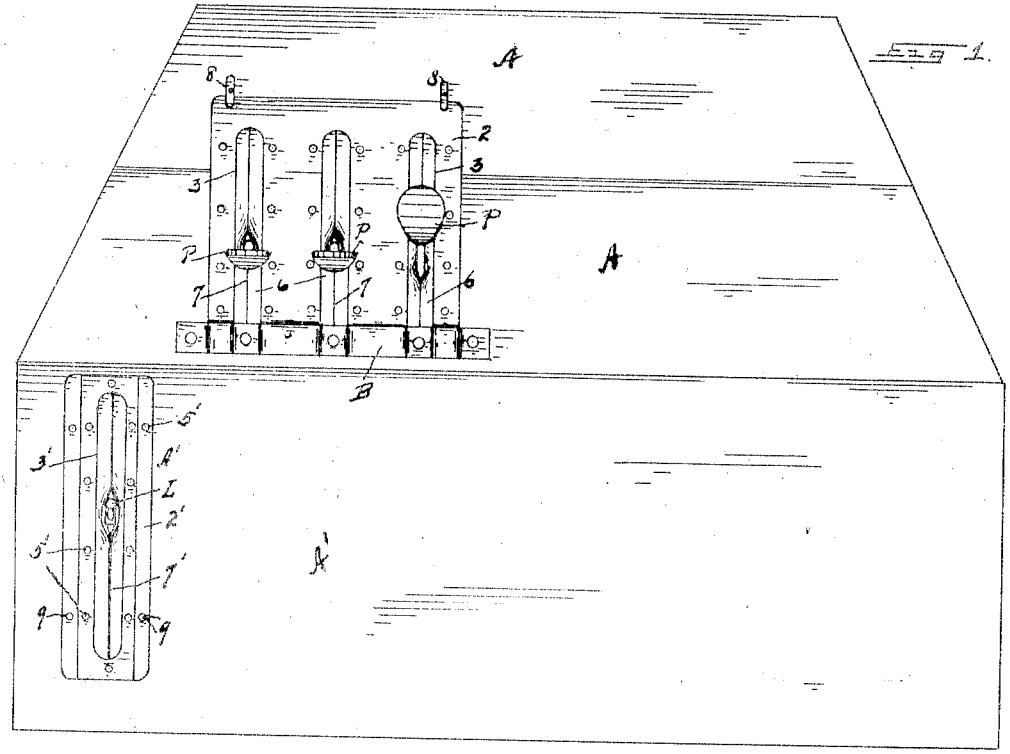
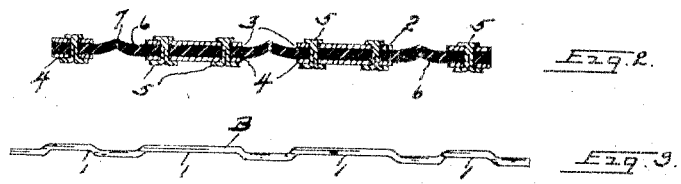
Joseph R. Valentine and
Frederick W. Alkire
INVENTOR
BY J. M. Thomas
ATTORNEY

UNITED STATES PATENT OFFICE.

JOSEPH R. VALENTINE AND FREDERICK W. ALKIRE, OF SALT LAKE CITY, UTAH.

FOOTBOARD WEATHER-GUARD.

1,385,287.   Specification of Letters Patent.   Patented July 19, 1921.

Application filed October 4, 1920. Serial No. 414,454.

*To all whom it may concern:*

Be it known that we, JOSEPH R. VALENTINE and FREDERICK W. ALKIRE, citizens of the United States, residing at Salt Lake City, in the county of Salt Lake and State of Utah, have invented certain new and useful Improvements in Footboard Weather-Guards, of which the following is a specification.

Our invention relates to guards for automobiles, and has for its object to provide a weather guard on the foot board of automobiles to keep out of such vehicles, heat, cold and dust which commonly enters through the slots and other openings provided in the foot boards for the pedals and levers by which the automobile is controlled and operated.

These objects we accomplish with the device illustrated in the accompanying drawings, in which similar letters and numerals of reference indicate like parts throughout the several figures and as described in the specification forming a part of the application and pointed out in the appended claim.

In the drawings, in which we have shown a substantial embodiment of our invention, Figure 1 is a plan view of the foot board of an automobile with our invention in place thereon. Fig. 2 is a transverse section on a line cutting the holding rivets. Fig. 3 is an edge view of the clamping plate, and Fig. 4 is a transverse section of the one slot form used at the emergency brake.

In order that the pedals and brake levers of some automobiles may be operated, slots are cut in the foot boards thereof and through which slots the pedals and levers are to be passed in placing the foot boards. Such slots allow dust, the heat of the engine, and cold to enter the automobile, and the present invention is intended to prevent this by providing a covering for said slots which will not impede the operation of such pedals and levers, but will allow their operation back and forth while the rubber will close the opening in front and behind the pedal arm or lever, and consists of a plate or flat bar B having portions thereof struck up as at 1 and which is to be fastened on the foot board A of the automobile. Two other flat plates 2 and 4 are to be detachably and adjacently fastened and hold as clamps a flat strip of rubber 6. Elongated slots 3 are cut into each of said plates 2 and 4 and the said plates are to be secured to the foot board. Said slots 3 will be held in alinement with the slots commonly provided for the pedals and levers of the vehicle, by inserting one end portion of said plate 2 into said recesses 1 and clamping the opposite edge of said plate 2 with thumb buttons 8. The said flat strip or piece of rubber 6 is slitted by cuts 7 therethrough, medially and parallel with said slots 3. The pedals P and lever L are to be passed through said slots 3 and slit 7. In putting the device in place the flat bar B is first secured in place along the ends of the slots that are already in place in the foot board; the said plates 2 and 4 with the rubber therebetween are then passed down over the foot pedals P of the automobile and the ends of the plate 2 inserted within the recesses 1 of said bar B. This will fasten one end portion of the device in place; the other end is secured by turning the said thumb buttons 8. The device may be given the form shown as a guard for the reverse lever slot, as shown on another portion of said foot board A'. In that form the under plate 4' is made narrower than the upper plate 2', while the rubber strip 6' is held between them by the rivets 5', and the device may be secured in place by tacks or short nails 9. One slot 3' is cut in both plates 2' and 4' while the rubber is slitted as at 7'.

We thus provide a new and novel weather guard for foot boards consisting of clamping plates with open slots therein and a slitted piece of rubber held between them to close the open slots provided in foot boards.

Having thus described our invention we desire to secure by Letters Patent and claim:

A weather guard for foot boards comprising two flat plates each having open slots therein, a thin strip of rubber secured in place between said plates having slits cut therein parallel with the slots in said plates; thumb buttons to hold one edge of said plates, and a flat bar recessed to receive the opposite edge of said plates and secured to the foot board.

In testimony whereof we have affixed our signatures.

JOSEPH R. VALENTINE.
FREDERICK W. ALKIRE.